United States Patent
Al Sheikh et al.

(10) Patent No.: US 10,838,731 B2
(45) Date of Patent: Nov. 17, 2020

(54) BRANCH PREDICTION BASED ON LOAD-PATH HISTORY

(71) Applicant: QUALCOMM Incorporated, San Diego, CA (US)

(72) Inventors: Rami Mohammad A. Al Sheikh, Morrisville, NC (US); Michael Scott McIlvaine, Raleigh, NC (US); Robert Douglas Clancy, Cary, NC (US); Derek Hower, Durham, NC (US)

(73) Assignee: Qualcomm Incorporated, San Diego, CA (US)

( * ) Notice: Subject to any disclaimer, the term of this patent is extended or adjusted under 35 U.S.C. 154(b) by 163 days.

(21) Appl. No.: 16/136,151

(22) Filed: Sep. 19, 2018

(65) Prior Publication Data

US 2020/0089504 A1    Mar. 19, 2020

(51) Int. Cl.
*G06F 9/38* (2018.01)
*G06F 9/30* (2018.01)

(52) U.S. Cl.
CPC ........ *G06F 9/3844* (2013.01); *G06F 9/30058* (2013.01)

(58) Field of Classification Search
None
See application file for complete search history.

(56) References Cited

U.S. PATENT DOCUMENTS

| | | | |
|---|---|---|---|
| 5,758,142 A | 5/1998 | McFarling et al. | |
| 6,438,673 B1 | 8/2002 | Jourdan et al. | |
| 6,779,108 B2 | 8/2004 | Ju et al. | |
| 7,788,473 B1 * | 8/2010 | Nelson | G06F 9/383 |
| | | | 712/219 |
| 7,890,738 B2 * | 2/2011 | Eisen | G06F 9/3844 |
| | | | 712/239 |

(Continued)

OTHER PUBLICATIONS

Gao H., et al., "Address-Branch Correlation: A Novel Locality for Long-Latency Hard-to-Predict Branches," 2008 IEEE 14th International Symposium on High Performance Computer Architecture, Salt Lake City, UT, 2008, pp. 74-85.

(Continued)

*Primary Examiner* — Michael Sun
(74) *Attorney, Agent, or Firm* — Muncy, Geissler, Olds & Lowe, P.C.

(57) ABSTRACT

Branch prediction methods and systems include, for a branch instruction fetched by a processor, indexing a branch identification (ID) table based on a function of a program counter (PC) value of the branch instruction, wherein each entry of the branch ID table comprises at least a tag field, and an accuracy counter. For a tag hit at an entry indexed by the PC value, if a value of the corresponding accuracy counter is greater than or equal to zero, a prediction counter from a prediction counter pool is selected based on a function of the PC value and a load-path history, wherein the prediction counters comprise respective confidence values and prediction values. A memory-dependent branch prediction of the branch instruction is assigned as the prediction value of the selected prediction counter if the associated confidence value is greater than zero, while branch prediction from a conventional branch predictor is overridden.

33 Claims, 5 Drawing Sheets

(56) References Cited

U.S. PATENT DOCUMENTS

| | | | |
|---|---|---|---|
| 7,900,026 B2* | 3/2011 | Park, II | G06F 9/30061 |
| | | | 712/239 |
| 8,301,871 B2* | 10/2012 | Luick | G06F 9/3804 |
| | | | 712/239 |
| 9,311,100 B2 | 4/2016 | Gupta et al. | |
| 9,477,478 B2 | 10/2016 | Kothari et al. | |
| 2004/0049667 A1* | 3/2004 | McCormick | G06F 9/30061 |
| | | | 712/233 |
| 2006/0095750 A1* | 5/2006 | Nye | G06F 9/3848 |
| | | | 712/240 |
| 2006/0248319 A1* | 11/2006 | Kadambi | G06F 9/3861 |
| | | | 712/234 |
| 2009/0125707 A1* | 5/2009 | Olson | G06F 9/3806 |
| | | | 712/240 |
| 2011/0093658 A1* | 4/2011 | Zuraski, Jr. | G06F 9/3844 |
| | | | 711/125 |
| 2014/0025938 A1* | 1/2014 | Gonion | G06F 9/30072 |
| | | | 712/239 |
| 2015/0046690 A1* | 2/2015 | Eickemeyer | G06F 9/3844 |
| | | | 712/239 |
| 2015/0301832 A1* | 10/2015 | Zhang | G06F 9/3861 |
| | | | 712/207 |
| 2017/0132009 A1 | 5/2017 | Pota et al. | |
| 2017/0286119 A1* | 10/2017 | Al Sheikh | G06F 9/3848 |
| 2019/0213008 A1* | 7/2019 | Bhat | G06F 9/3851 |
| 2019/0384609 A1* | 12/2019 | McLellan | G06F 9/3806 |

OTHER PUBLICATIONS

Evers M., et al., "Using Hybrid Branch Predictors to Improve Branch Prediction Accuracy in the Presence of Context Switches", Proceedings of the 23rd. Annual Symposium on Computer Architecture. Philadelphia, May 22-24, 1996; [Proceedings of the Annual Symposium on Computer Architecture], New York, ACM/IEEE, US, May 1, 1996 (May 1, 1996), pp. 3-11, XP058269142, DOI: 10.1145/232973.232975, ISBN: 978-0-89791-786-5.

International Search Report and Written Opinion—PCT/US2019/051772—ISA/EPO—dated Dec. 5, 2019.

Mittal S: "A Survey of Techniques for Dynamic Branch Prediction", arxiv.org, Cornell University Library, 201, OLIN Library Cornell University Ithaca, NY 14853, Apr. 1, 2018 (Apr. 1, 2018), pp. 1-36, XP080866612.

* cited by examiner

```
100
    Int A[A_LEN]; // array A

// <<< initialize A with random values >>>
                                                              110
    While(...) {        LOAD          R1 = A[i]
      ...               X: BRANCH     R1 > 16
      For(...) {
         If (A[i] > 16) {   // hard to predict
            ...
         }
      } // end of For loop
    } // end of while loop
```

Data-dependent load

FIG. 1

(Related Art)

United States Patent US 10,838,731 B2

BRANCH PREDICTION BASED ON LOAD-PATH HISTORY

FIELD OF DISCLOSURE

Disclosed aspects are directed to branch prediction in processing systems. More specifically, exemplary aspects are directed to the use of load-path history as context information in the prediction of hard-to-predict branch instructions such as memory-dependent branch instructions.

BACKGROUND

Processing systems may employ instructions which cause a change in control flow, such as branch instructions. The direction of a branch instruction may be based, for example, on how a condition evaluates, but this evaluation may not be known until processing of the branch instruction has proceeded deep down an instruction pipeline of a processor. To avoid stalling the pipeline until the evaluation is known, the processor may employ branch prediction mechanisms to predict the direction of the branch instruction early in the pipeline. Based on the prediction, the processor can speculatively fetch and execute instructions from a predicted address in one of two paths—a "taken" path which starts at the branch target address, with a corresponding direction referred to as the "taken direction"; or a "not-taken" path which starts at the next sequential address after the conditional branch instruction, with a corresponding direction referred to as the "not-taken direction".

When the condition is evaluated and the actual branch direction is determined, if the branch was mispredicted, (i.e., execution followed a wrong path) the speculatively fetched instructions may be flushed from the pipeline, and new instructions in a correct path may be fetched from the correct next address. Therefore, improving accuracy of branch prediction mitigates penalties associated with mispredictions and execution of wrong path instructions, and correspondingly improves performance and energy utilization of a processing system.

Accordingly, branch prediction is seen to play an important role in high performance pipelined processors. Conventional branch predictors may use context information in making the branch predictions. Such context information may include global and/or local branch history, branch path history, branch target history, etc. However, the conventional branch predictors are seen to fail in being able to accurately predict certain types of branch instructions, including branch instructions whose directions may not correlate with the aforementioned context information. A class of such hard-to-predict branch instructions includes memory-dependent branch instructions, wherein the direction or outcome of the branch instruction depends directly or indirectly on values loaded from memory.

Figure 1:
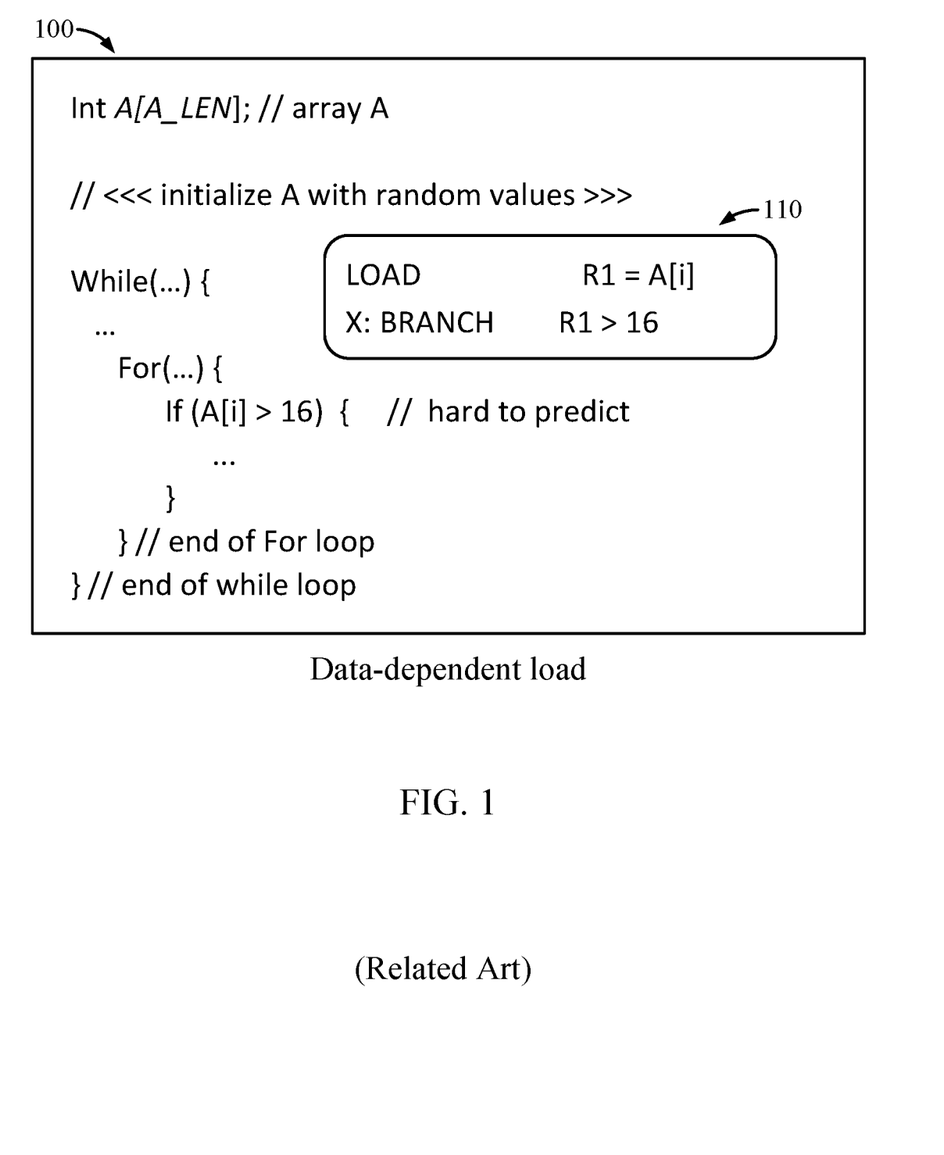
FIG. 1 illustrates an example instruction sequence illustrating memory-dependent branch instructions.

FIG. 1 illustrates code snippets, including pseudocode 100 juxtaposed with corresponding program instructions 110, as an example of hard-to-predict memory-dependent branch instructions. Illustrated portions of pseudocode 100 include a program which receives data values from a data array "A" in memory. Specifically, for the pseudocode "if (a[i]>16)" appearing within a "for" loop for values of "i" in pseudocode 100, the corresponding program instructions may include loading a value from an array element in the memory located at an address A[i] into register R1, and then evaluating the branch instruction "X" based on whether the loaded value in the register, "R1>16". In other words, the outcome of the branch instruction "X" depends on the data value of the array element stored at address A[i] in memory, and so the branch instruction "X" is referred to as a memory-dependent branch instruction. The branch instruction "X" is hard-to-predict using conventional branch predictors because the data value at address "A[i]" in memory is not easy to predict, given a poor correlation with the aforementioned context information such as global and/or local branch history, branch path history, branch target history, etc.

Program instructions involving memory-dependent branch instructions may be encountered in various other instruction sequences/application programs. Therefore, there is a need in the art for overcoming the limitations of conventional branch predictors and being able to accurately predict even the above-described types of hard-to-predict branch instructions.

SUMMARY

Exemplary aspects of the invention are directed to systems and methods for branch prediction of hard-to-predict branch instructions such as memory-dependent branch instructions.

For example, an exemplary aspect is directed to a method of branch prediction in a processor, the method comprising for a branch instruction fetched by the processor for execution, indexing a branch identification (ID) table based on a function of a program counter (PC) value of the branch instruction, wherein the branch ID table comprises one or more entries, with each entry comprising at least a tag field, and an accuracy counter. For a tag hit at an entry of the branch ID table indexed by the PC value wherein the tag field of the entry matches the PC value, if a value of the accuracy counter is greater than or equal to zero, the method comprises selecting a prediction counter from a prediction counter pool comprising a plurality of prediction counters, wherein each of the plurality of prediction counters in the prediction counter pool comprises at least a respective confidence value and a prediction value, wherein the selecting is based on a function of the PC value and a load-path history, and wherein the load-path history comprises information from prior load instructions executed by the processor. The method further comprises assigning a memory-dependent branch prediction of the branch instruction as the prediction value of the selected prediction counter if the confidence value of the selected prediction counter is greater than zero.

Another exemplary aspect is directed to an apparatus comprising a processor configured to execute instructions, wherein the processor comprises at least a load-path history based branch predictor. The load-path history based branch predictor comprises a branch identification (ID) table comprising one or more entries, with each entry comprising at least a tag field, and an accuracy counter and a prediction counter pool comprising a plurality of prediction counters. For a branch instruction fetched by the processor for execution, the branch identification (ID) table is indexed based on a function of a program counter (PC) value of the branch instruction. For a tag hit at an entry of the branch ID table indexed by the PC value wherein the tag field of the entry matches the PC value, if a value of the accuracy counter is greater than or equal to zero, a prediction counter is selected from the prediction counter pool, wherein each of the plurality of prediction counters in the prediction counter pool comprises at least a respective confidence value and a prediction value, wherein the prediction counter is selected based on a function of the PC value and a load-path history, wherein the load-path history comprises information from prior load instructions executed by the processor. The load-path history based branch predictor is configured to assign a memory-dependent branch prediction of the branch instruction as the prediction value of the selected prediction counter if the confidence value of the selected prediction counter is greater than zero.

Another exemplary aspect is directed to an apparatus comprising means for executing instructions, and means for storing one or more entries for predicting memory-dependent branch instructions, each entry comprising at least means for storing a tag value and means for storing an accuracy value for the entry, wherein for a branch instruction fetched for execution by the means for executing instructions, the means for storing entries is indexed based on a function of a program counter (PC) value of the branch instruction. The apparatus further comprises a plurality of means for indicating prediction values and associated confidence values, wherein, for a tag hit at an entry of the branch ID table indexed by the PC value, wherein the tag value matches the PC value, if the accuracy value is greater than or equal to zero, means for selecting one of the plurality of means for indicating, based on a function of the PC value and a load-path history, wherein the load-path history comprises information from prior load instructions executed by the means for executing. The apparatus further comprises means for assigning a memory-dependent branch prediction of the branch instruction as the prediction value of the selected means for indicating if the associated confidence value is greater than zero.

Another exemplary aspect is directed to a non-transitory computer-readable storage medium comprising code, which, when executed by a computer causes the computer to perform branch prediction in a processor. The non-transitory computer-readable storage medium comprises, for a branch instruction fetched by the processor for execution, code for indexing a branch identification (ID) table based on a function of a program counter (PC) value of the branch instruction, wherein the branch ID table comprises one or more entries, with each entry comprising at least a tag field, and an accuracy counter. For a tag hit at an entry of the branch ID table indexed by the PC value, wherein the tag field of the entry matches the PC value, if a value of the accuracy counter is greater than or equal to zero, code is provided for selecting a prediction counter from a prediction counter pool comprising a plurality of prediction counters, wherein each of the plurality of prediction counters in the prediction counter pool comprises at least a respective confidence value and a prediction value, wherein the code for selecting is based on a function of the PC value and a load-path history, wherein the load-path history comprises information from prior load instructions executed by the processor. Further included is code for assigning a memory-dependent branch prediction of the branch instruction as the prediction value of the selected prediction counter if the confidence value of the selected prediction counter is greater than zero.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Aspects of this disclosure are directed to improving performance related to processing hard-to-predict branch instructions such as memory-dependent branch instructions. More specifically, exemplary aspects are directed to using exemplary context information, referred to herein as a "load-path history", as a proxy for memory address in the branch prediction of memory-dependent branch instructions. The load-path history for a load instruction may include information from prior load instructions. An exemplary load-path history may be constructed by shifting the least-significant, non-zero N bits from each of the prior load instructions' program counter (PC) values (i.e., bits 2 through N+1, wherein N is a positive integer) into an exemplary load-path history register. By using load-path history, instead of memory address, the prediction of a memory-dependent branch instruction may be performed early in an instruction pipeline of a processor, e.g., at a fetch stage. An exemplary overriding branch predictor that can be indexed and tagged using the branch instruction's PC, the load-path history, or a hash of both, is also disclosed according to exemplary aspects herein.

By way of background, it is recognized herein that the branch outcome of a memory-dependent branch instruction may correlate with the memory addresses of one or more load instructions feeding the branch instruction (e.g., the load instruction loading register "R5", which feeds the branch instruction "X" in program instruction 110 of FIG. 1). In another example, a code snippet with three instructions enumerated with the numerals 1-3 is described in the passage below, wherein in instruction 1, a load instruction loads a value from a memory address ADDR into register R1; in instruction 2, the loaded value in register R1 is compared with the value "0"; and in instruction 3, a branch not equal (BNE) instruction branches to a direction set by the value LABEL. The branch instruction BNE depends on the value loaded from the memory address (ADDR), and as such is a memory-dependent branch instruction.

1. Load R1, MEM[ADDR]
2. CMP R1, 0x0
3. BNE LABEL

In known approaches to predicting the BNE instruction, a memory-dependent branch instruction, dependent on the data value at memory address ADDR, predictions for the branch instruction may be based on the memory address ADDR. For example, a branch predictor may use the memory address ADDR to index a prediction table containing predictions, read out an indexed prediction and use that indexed prediction, e.g., in lieu of a default branch prediction provided by a conventional branch predictor relying on aforementioned conventional context information. However, since the memory address ADDR is used for indexing the prediction table, the branch prediction process using this approach can commence only after the memory address ADDR becomes available, which would be late in the instruction pipeline (e.g., at an address generation stage, "AGEN", in the backend of a conventional instruction pipeline). Furthermore, there may be a reliance on complex tracking logic for detecting that the branch instruction BNE is dependent on that particular instance of the load instruction which loads the data from the memory address ADDR. These drawbacks prevent the known approaches from delivering an efficient prediction which is sufficiently early in the pipeline to avoid substantial resource wastage from executing wrong path instructions.

To overcome the above drawbacks, in exemplary aspects, the load-path history, as previously mentioned, is used for predicting the memory-dependent branch instruction (e.g., BNE), rather than relying on the memory address (e.g., ADDR) that a load instruction, feeding the memory-dependent branch instruction, loads its data from.

Figure 2:
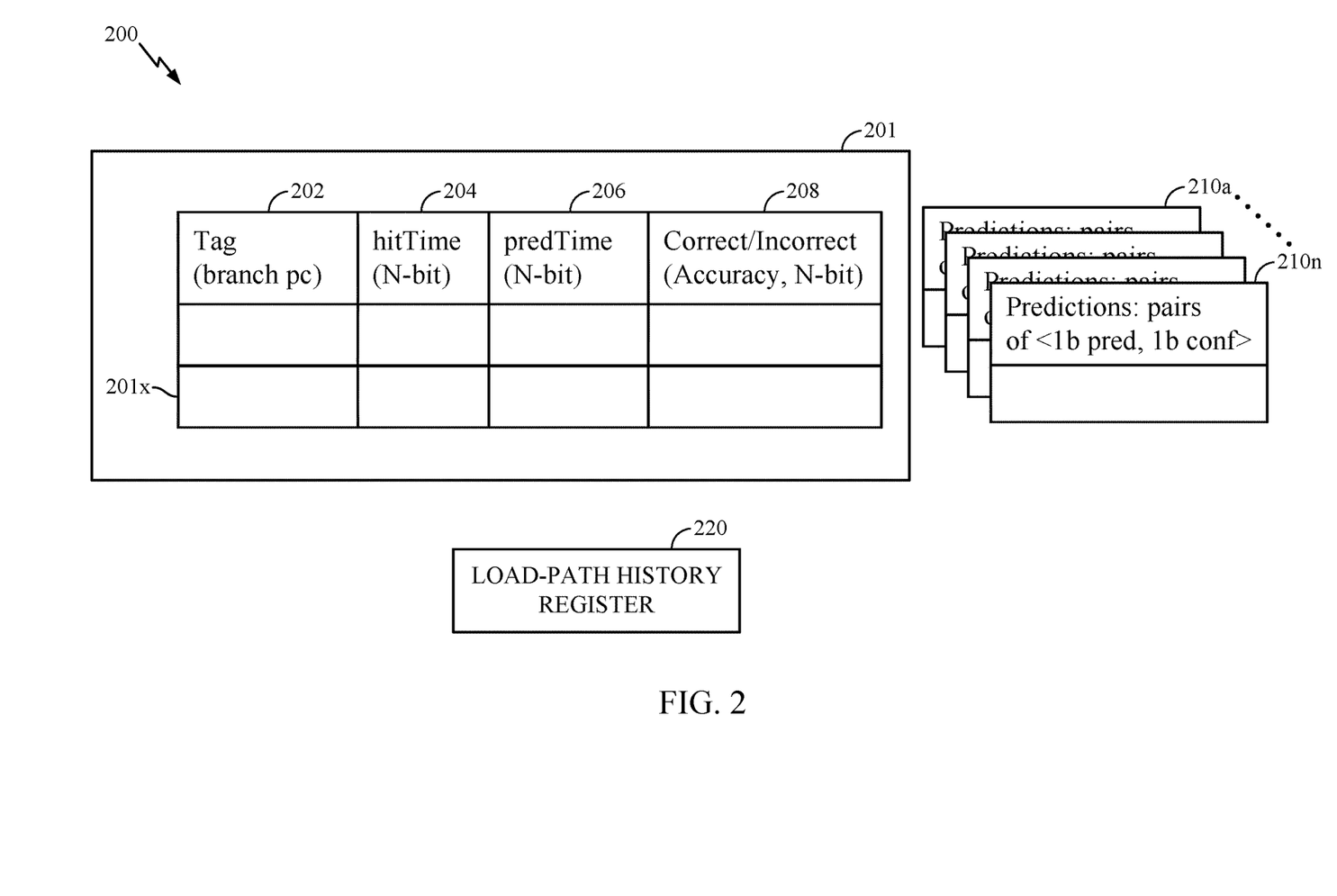
FIG. 2 illustrates a load-path history based branch predictor, according to aspects of this disclosure.

With reference now to FIG. 2, an exemplary branch predictor using load-path history for prediction of memory-dependent branch instructions is shown, and hereinafter referred to as load-path history based predictor (LdPHist-Pred) 200. The components of load-path history based predictor 200 will first be briefly enumerated, followed by a detailed discussion of the operations and interactions of these components. As such, at a high level, load-path history based predictor 200 comprises branch identification (ID) table 201 and N prediction counters in prediction counter pool 210a-n (wherein N is a positive integer and is greater than or equal to 1).

Branch ID table 201 may be a direct-mapped table in one implementation, wherein each of one or more entries of branch ID table 201 may be indexed using the PC of a branch instruction, and also tagged with the branch instruction's PC, as shown in tag field 202 in branch ID table 201. Apart from tag field 202, each entry of branch ID table 201 also comprises two timestamps, shown in the fields last hit timestamp 204 and last prediction timestamp 206. Each entry further comprises a signed accuracy counter 208 which increments when a prediction made using the entry is correct and decrements when the prediction is incorrect. Each of last hit timestamp 204, last prediction timestamp 206, and accuracy counter 208 may be N-bits wide in one implementation.

The N prediction counters in prediction counter pool 210a-n may each comprise, for example, 2-bit prediction counters with bit-0 and bit-1, wherein bit-0 indicates a confidence, and bit-1 represents the prediction direction made by the respective 2-bit prediction counter. The particular prediction counter of prediction counter pool 210a-n to be used for an entry indexed by a branch instruction PC may be selected using a function such as a hash of the branch instruction PC.

Additionally, load-path history based predictor 200 may be augmented with two lists that track the performance of load-path history based predictor 200 for different branch instruction PCs.

A first of the two lists is referred to as a golden list, which stores the PCs of the branch instructions for which load-path history based predictor 200 is said to perform very well (which will be explained further). A branch instruction's PC may be inserted in the golden list at the time an associated entry is evicted from branch ID table 201 if the value of the signed accuracy counter 208 is much greater than 0 (or "accuracy >>0").

A second of the two lists, referred to as a black list, stores the PCs of the branch instructions for which load-path history based predictor 200 is said to perform poorly. A branch instruction is inserted in the black list at the time an associated entry is evicted from branch ID table 201 if the value of the signed accuracy counter 208 is much lower than 0 (or "accuracy <<0").

A process of predicting the direction of branch instructions, such as hard-to-predict memory-dependent branch instructions will now be described with reference to FIG. 2. For a branch instruction fetched by a processor (an example implementation of such a processor will be discussed in FIG. 3), the branch instruction's PC (or a function or hash thereof) may be used to index branch ID table 201. As previously mentioned, a load-path history for a load instruction may include information from prior load instructions. An exemplary load-path history may be constructed by shifting the least significant, non-zero N bits from each of the prior load instructions' program counter (PC) values (i.e., bits 2 through N+1) into an exemplary load-path history register 220.

As will be recalled, branch ID table 201 comprises tag field 202 for each of its entries, wherein if at the indexed entry using the hash of the branch instruction's PC, for example, tag field 202 matches the branch instruction's PC, then a tag hit is said to occur; otherwise, if there is a mismatch, then a tag miss is said to occur. In FIG. 2, an entry 201x is representatively shown as the indexed entry to facilitate the following discussion.

In the case of a tag hit for entry 201x, last hit timestamp 204 is updated with the time (e.g., derived from a clock, not shown) that the tag hit occurred. Further, accuracy counter 208 for entry 201x is consulted, and if the value of that accuracy counter 208>=0, then the corresponding prediction counter of prediction counter pool 210a-n is read out. The corresponding prediction counter for entry 201x may be selected using a hash of the branch instruction's PC and the current value of load-path history register 220.

If the value of the prediction counter at the selected prediction counter is confident (e.g., a confidence bit for the selected prediction counter is set), then the value obtained from the prediction counter is used to predict the branch instruction. In this regard, a default branch predictor which may exist in the processor for conventional branch prediction may be overridden and the prediction obtained from the above process of consulting load-path history based predictor 200 may be used instead. Upon the prediction being obtained, the last prediction timestamp 206 for entry 201x in the branch ID table 201 is also updated with the time at which the prediction was obtained.

On the other hand, if there is a tag miss at entry 201x, then load-path history based predictor 200 is not used for predicting the branch instruction; the default branch predictor may be used.

By using the load-path history in the manner discussed above, the load instruction which would load the data value from a memory address, the data value on which the memory-dependent branch instruction evaluates, it is possible to accurately predict the direction of the memory-dependent branch instruction, e.g., if there is a tag hit in branch ID table 201 for the memory-dependent branch instruction. The following section discusses how load-path history based predictor 200 is trained in order to provide this accurate prediction for memory-dependent branch instructions.

In exemplary aspects, training of load-path history based predictor 200 may be initiated if the default branch predictor mispredicts or if load-path history based predictor 200 received a tag hit at prediction time. Accordingly, there are two scenarios for training load-path history based predictor 200: on a tag hit or a on a tag miss of branch ID table 201, which will be discussed in turn below.

In a first training process, on a tag hit of branch ID table 201, accuracy counter 208 may be updated, by being incremented if the prediction made using load-path history based predictor 200 (e.g., obtained from a corresponding one of N prediction counters in prediction counter pool 210a-n) is correct, i.e., if the branch instruction's evaluated outcome/direction matches prediction made using load-path history based predictor 200; otherwise, upon misprediction, accuracy counter 208 may be decremented.

The appropriately selected prediction counter of prediction counter pool 210a-n (e.g., selected using a hash of the branch instruction's PC and the load-path history) may be updated as follows. If the prediction bit (e.g., wherein a value of "1" indicates taken and a value of "0" indicates not-taken) of the selected prediction counter matches the evaluated outcome/direction of the branch instruction, the confidence bit in the prediction counter is set to a confident value (e.g., to a value "1."); otherwise, if the prediction hit of the selected prediction counter does not match the evaluated outcome/direction of the branch instruction the confidence bit is reset to a not-confident value (e.g., to a value "0") and the prediction bit is set to match the branch instruction's outcome.

In a second training process, upon a tag miss in branch ID table 201, an attempt is made to allocate an entry in branch ID table 201 (it is noted that allocation and replacement of entries in branch ID table 201 will be discussed in further detail in the following sections). If the allocation attempt is successful, the allocated entry of branch D table 201 may be updated by setting corresponding tag field 202 to the branch instruction's PC, and updating the last hit and last prediction timestamps 204 and 206 appropriately with the respective timestamps as previously explained. Accuracy counter 208 may be set to "0" and the corresponding prediction counter of prediction counter pool 210a-n may be set in a manner consistent with the above description for the tag hit in branch ID table 201.

Allocating and replacing entries of branch ID table 201 will now be discussed in further detail. An entry in branch ID table 201 may be allocated at a certain point in time (a current time shown of a local clock) if one of the following conditions is met, wherein X is a selectable large number, e.g., 16K.

1. Condition 1: the entry of branch ID table 201 indexed by the branch instruction's PC shows low activity, e.g., as defined by last hit timestamp 204 (or hitTime)+X being less than the current time (or "hitTime+ 1.*X<currentTime")
2. Condition 2: the indexed entry shows low reward, e.g., as defined by the last prediction timestamp 206 (or predTime)+8*X being less than the current time (or "predTime+8*X<currentTime").
3. Condition 3: the indexed entry shows poor accuracy, e.g., as defined by the value of accuracy counter 208 being less than zero (or "accuracy <0"); or
4. Condition 4: the branch instruction for which allocation is being attempted is on the previously defined golden list It is noted herein that allocation is not performed for a branch instruction in branch ID table 201 if the branch instruction is on the black list. The aforementioned heuristics or conditions provide protection against cases in which, for example, the instruction footprint is too big (hence, meeting condition 1, wherein a particular branch instruction's PC may display low activity in an instruction sequence), the data value stored in the memory location is changing (which means that predicting the data value using the load-path history may be inaccurate), or, the entry being allocated is no longer needed.

Figure 3:
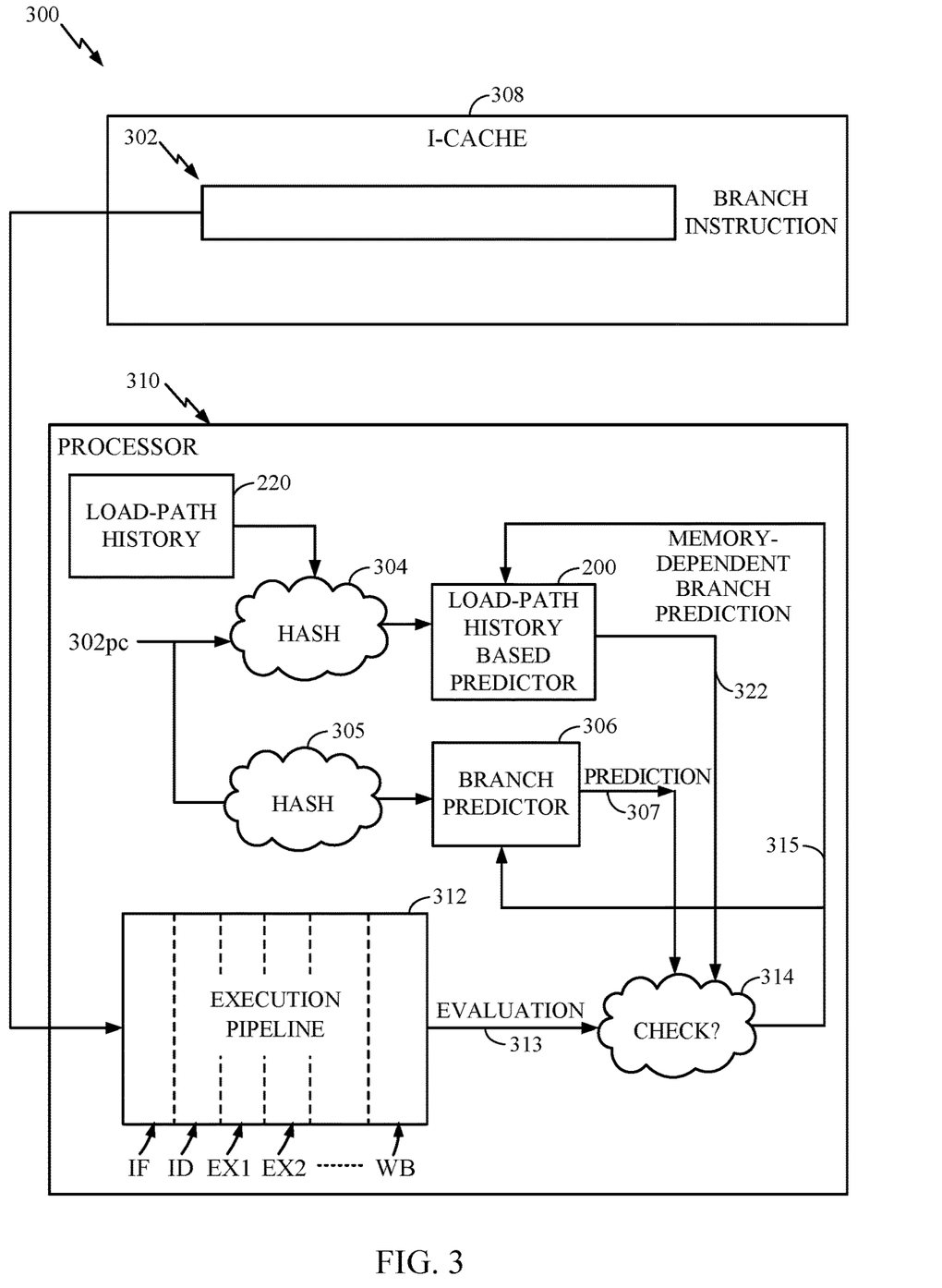
FIG. 3 illustrates a processing system incorporating an exemplary load-path history based branch predictor, according to aspects of this disclosure.

With reference now to FIG. 3, an exemplary processing system 300 in which aspects of this disclosure may be employed, is shown. Processing system 300 is shown to comprise processor 310 coupled to instruction cache 308. Although not shown in this view, additional components such as functional units, input/output units, interface structures, memory structures, etc., may also be present but have not been explicitly identified or described as they may not be germane to this disclosure. As shown, processor 310 may be configured to receive instructions from instruction cache 308 and execute the instructions using for example, execution pipeline 312. Execution pipeline 312 may be configured may include one or more pipelined stages for performing instruction fetch (IF), instruction decode (ID), one or more execute stages (EX1, EX2, . . . ), and write back (WB) operations as known in the art. Representatively, a branch instruction is shown in instruction cache 308 and identified as branch instruction 302.

In an exemplary implementation, branch instruction 302 may have a corresponding address or program counter (PC) value of 302pc. Processor 310 is generally shown to include a default conventional branch predictor 306, which may further include branch prediction units such as a history table comprising a history of behavior of prior branch instructions, state machines such as branch prediction counters, etc., as known in the art. In other words, branch predictor 306 may use conventional context information discussed above in predicting branch instructions which are not hard-to-predict branch instructions. When branch instruction 302 is fetched by processor 310 for execution, for the conventional branch instructions, logic such as hash 305 (e.g., implementing an XOR function) may utilize the address or PC value 302pc and/or other information from branch instruction 302 to access branch predictor 306 and retrieve prediction 307, which represents a default prediction of branch instruction 302.

In exemplary aspects, processor 310 also includes load-path history based predictor 200, an example implementation of which has been described above with reference to FIG. 2. As discussed with reference to FIG. 2, branch ID table 201 of load-path history based predictor 200 may be indexed using a hash (e.g., obtained from logic such as hash 304) of PC value 302pc of branch instruction 302 and the load-path history from load-path history register 220. The output of load-path history based predictor 200, obtained using the above-described process is shown as memory-dependent branch prediction 322, but may generally represent the branch prediction of any hard-to-predict branch instruction for which branch predictor 306 is overridden. For example, if load-path history based predictor 200 is used for predicting a branch instruction, then memory-dependent branch prediction 322 may serve as the prediction for branch instruction 302 in lieu of prediction 307 provided by branch predictor 306. As can be appreciated, since memory-dependent branch prediction 322 may be obtained based on load-path history register 220 and branch instruction PC 302pc, memory-dependent branch prediction 322 may be available very early in execution pipeline 312, e.g., in the instruction fetch IF stage.

Continuing with the description of FIG. 3, branch instruction 302 may be speculatively executed in execution pipeline 312 (based on a direction derived from either prediction 307 or memory-dependent branch prediction 322). After traversing one or more pipeline states, an actual evaluation of branch instruction 302 will be known, and this is shown as evaluation 313. Evaluation 313 is compared with the prediction upon which the branch instruction 302 was speculatively executed (i.e., either prediction 307 or memory-dependent branch prediction 322, as the case may be) in prediction check block 314 to determine whether evaluation 313 matched the speculatively executed direction, or in other words, whether branch instruction 302 was correctly predicted or was mispredicted). In an example implementation, bus 315 comprises information comprising the correct evaluation 313 (taken/not-taken) as well as whether branch instruction 302 was correctly predicted or mispredicted. The information on bus 315 may be supplied to both load-path history based predictor 200 and to the default branch predictor 306. For example, updating accuracy counter 208 during the above-mentioned training processes of branch ID table 201 may use the information on bus 315 to determine whether the branch instruction's evaluated outcome/direction (i.e., correct evaluation 313) matches predictions made using load-path history based predictor 200 (i.e., memory-dependent branch prediction 322). Accordingly, load-path history based predictor 200 may be incorporated in processing system 300 in a manner which is consistent with the description of load-path history based predictor 200 with reference to FIG. 2.

Accordingly, it will be appreciated that exemplary aspects include various methods for performing the processes, functions and/or algorithms disclosed herein. For example, FIG. 4 (with combined references below to FIGS. 2-3) illustrates a method 400 of branch prediction in a processor (e.g., processor 310).

Figure 4:
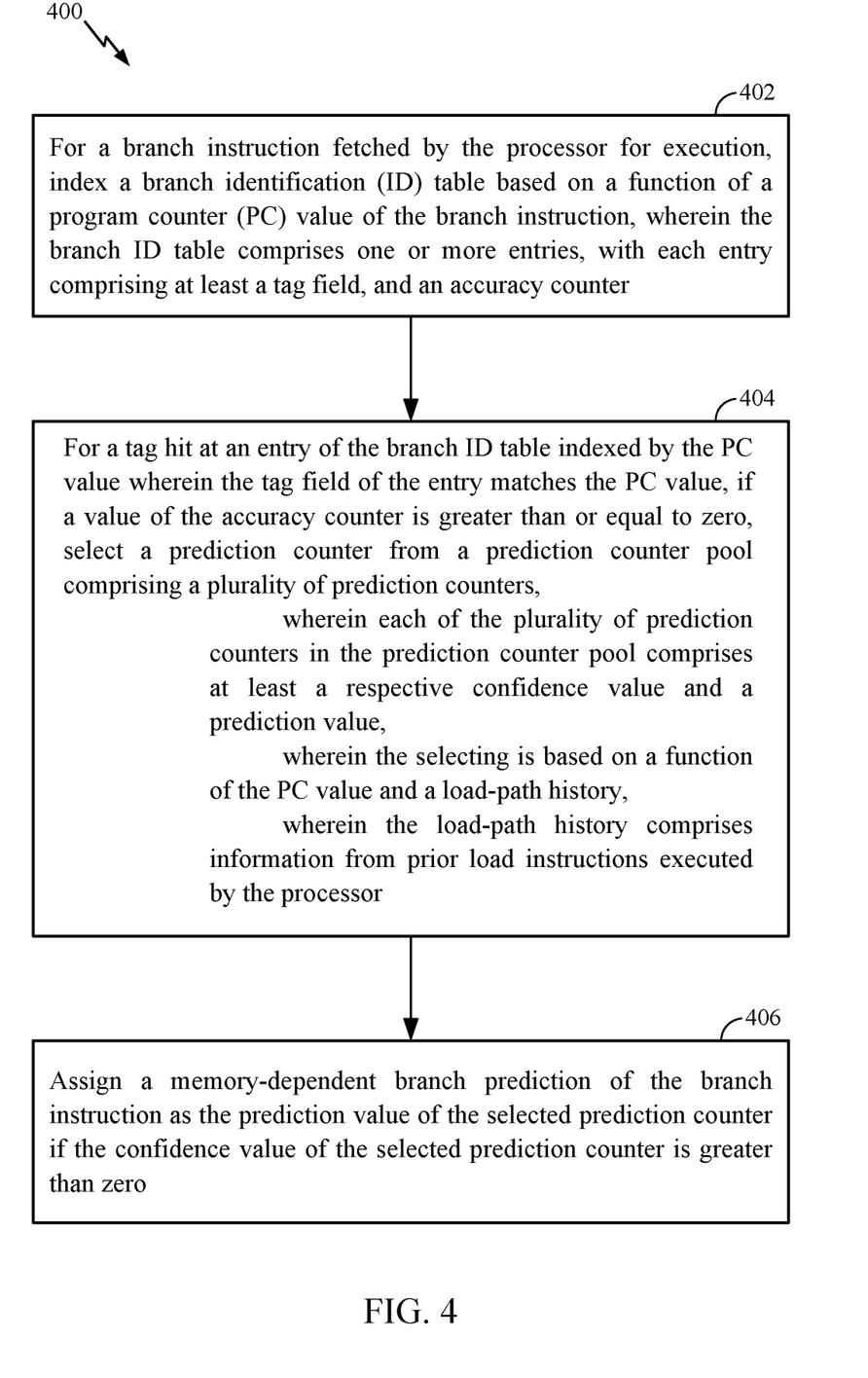
FIG. 4 illustrates a method of branch prediction using an exemplary load-path history based branch predictor, according to aspects of this disclosure.

In Block 402, for a branch instruction (e.g., branch instruction 302) fetched by the processor for execution, indexing a branch identification (ID) table (e.g., branch ID table 201) based on a function of a program counter (PC) value (e.g., 302pc) of the branch instruction, wherein the branch ID table comprises one or more entries, with each entry (e.g., entry 201x) comprising at least a tag field (e.g., tag field 202), and an accuracy counter (e.g., accuracy counter 208).

In Block 404, for a tag hit wherein a tag field at an entry (e.g., entry 201x) of the branch ID table corresponding to the index matches the PC value, and if a value of the accuracy counter is greater than or equal to zero, select a prediction counter from a prediction counter pool comprising a plurality of prediction counters (e.g., prediction counter pool 210a-n), wherein each of the plurality of prediction counters in the prediction counter pool comprises at least a respective confidence value (e.g., bit-0) and a prediction value (e.g., bit-1), wherein the selecting is based on a function of the PC value and a load-path history (e.g., from load-path history register 220), wherein the load-path history comprises information from prior load instructions executed by the processor.

Block 406 comprises assigning a memory-dependent branch prediction (e.g., prediction 322) of the branch instruction as the prediction value of the selected prediction counter if the confidence value of the selected prediction counter is greater than zero.

Figure 5:
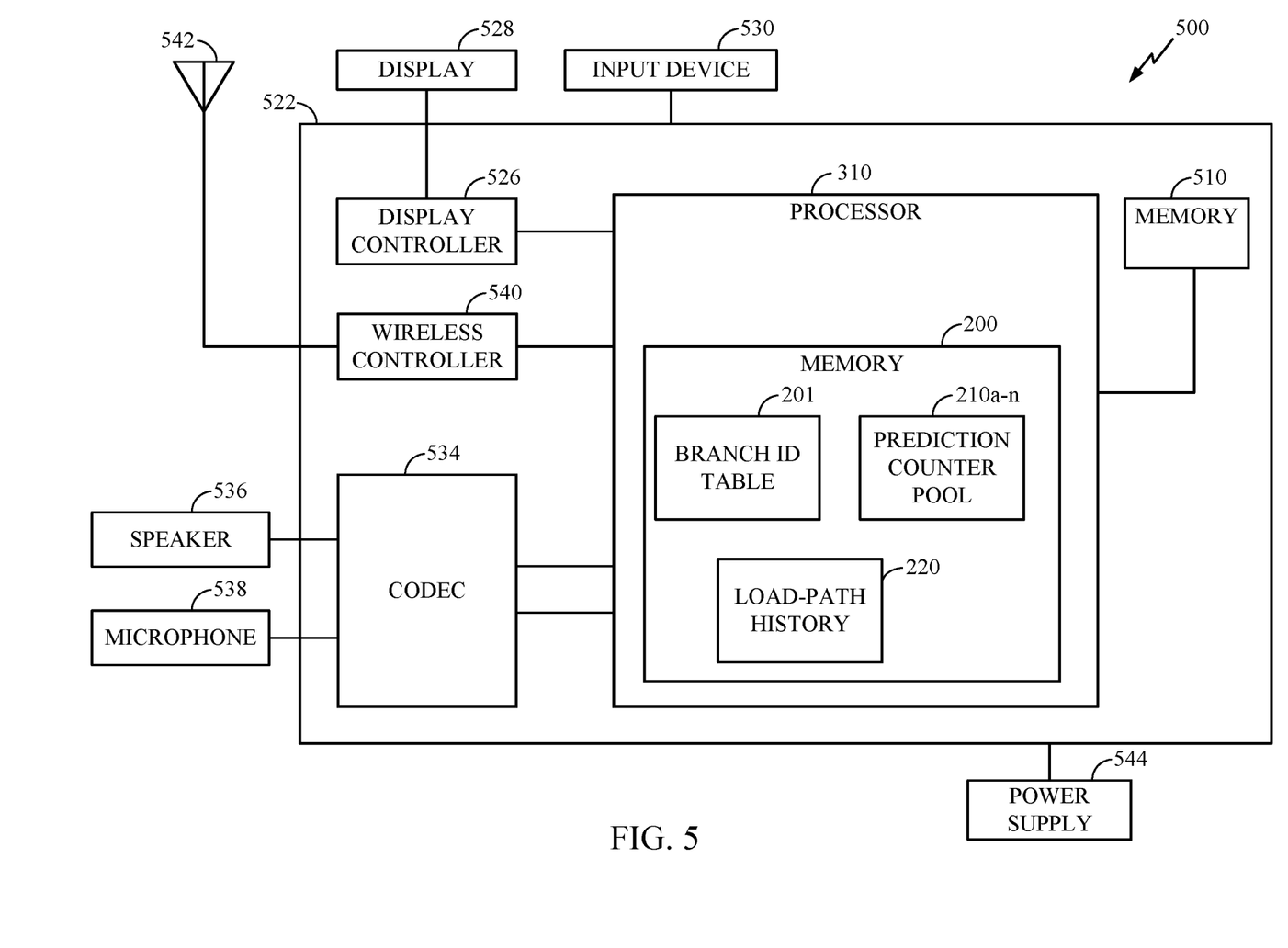
FIG. 5 depicts an exemplary computing device in which an aspect of the disclosure may be advantageously employed.

An example apparatus, in which exemplary aspects of this disclosure may be utilized, will now be discussed in relation to FIG. 5. FIG. 5 shows a block diagram of computing device 500. Computing device 500 may correspond to an exemplary implementation of a processing system 300 of FIG. 3, wherein processor 310 may comprise load-path history based predictor 200 of FIG. 2, shown with branch ID table 201, prediction counter pool 210a-n, and load-path history register 220 in this view, while other details shown and described with reference to FIGS. 2-3 have been omitted for the sake of clarity. Memory 510 in communication with processor 310 has also been shown.

FIG. 5 also shows display controller 526 that is coupled to processor 310 and to display 528. In some cases, computing device 500 may be used for wireless communication and FIG. 5 also shows optional blocks in dashed lines, such as coder/decoder (CODEC) 534 (e.g., an audio and/or voice CODEC) coupled to processor 310 and speaker 536 and microphone 538 can be coupled to CODEC 534; and wireless antenna 542 coupled to wireless controller 540 which is coupled to processor 310. Where one or more of these optional blocks are present, in a particular aspect, processor 310, display controller 526, memory 510, and wireless controller 540 are included in a system-in-package or system-on-chip device 522.

Accordingly, a particular aspect, input device 530 and power supply 544 are coupled to the system-on-chip device 522. Moreover, in a particular aspect, as illustrated in FIG. 5, where one or more optional blocks are present, display 528, input device 530, speaker 536, microphone 538, wireless antenna 542, and power supply 544 are external to the system-on-chip device 522. However, each of display 528, input device 530, speaker 536, microphone 538, wireless antenna 542, and power supply 544 can be coupled to a component of the system-on-chip device 522, such as an interface or a controller.

It should be noted that although FIG. 5 generally depicts a computing device, processor 310 and memory 510, may also be integrated into a set top box, a server, a music player, a video player, an entertainment unit, a navigation device, a personal digital assistant (PDA), a fixed location data unit, a computer, a laptop, a tablet, a communications device, a mobile phone, or other similar devices.

Furthermore, it will also be understood that aspects of this disclosure may also include an apparatus (e.g., processing system 300) comprising means for executing instructions (e.g., processor 310), means for storing one or more entries for predicting memory-dependent branch instructions (e.g., branch ID table 201), each entry comprising at least a means for storing a tag value (e.g., tag field), and a means for storing an accuracy value for the entry (e.g., accuracy counter 208), wherein for a branch instruction fetched for execution by the means for executing instructions, the means for storing entries is indexed based on a function of a program counter (PC) value of the branch instruction (e.g., branch instruction 302's PC value 302pc). The apparatus may further include a plurality of means for indicating (e.g., prediction counter pool 210a-n) prediction values (e.g., bit-0) and associated confidence values (e.g., bit-1); wherein, for a tag hit at an entry of the branch ID table indexed by the PC value wherein the tag value of the entry matches the PC value, if the accuracy value is greater than or equal to zero, means for selecting one of the plurality of means for indicating, based on a function (e.g., hash 304) of the PC value and a load-path history (e.g., from load-path history register 220), wherein the load-path history comprises information from prior load instructions executed by the means for executing. The apparatus further comprises means for assigning a memory-dependent branch prediction of the branch instruction (e.g., load-path history based predictor 200) as the prediction value of the selected means for indicating if the associated confidence value is greater than zero.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer-readable media embodying a method for predicting memory-dependent branch instructions. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of branch prediction in a processor, the method comprising:
   for a branch instruction fetched by the processor for execution, indexing a branch identification (ID) table based on a function of a program counter (PC) value of the branch instruction, wherein the branch ID table comprises one or more entries, with each entry comprising at least a tag field, and an accuracy counter;
   for a tag hit at an entry of the branch ID table indexed by the PC value wherein the tag field of the entry matches the PC value, if a value of the accuracy counter is greater than or equal to zero, selecting a prediction counter from a prediction counter pool comprising a plurality of prediction counters,
      wherein each of the plurality of prediction counters in the prediction counter pool comprises at least a respective confidence value and a prediction value,
      wherein the selecting is based on a function of the PC value and a load-path history,
      wherein the load-path history comprises information from prior load instructions executed by the processor; and
   assigning a memory-dependent branch prediction of the branch instruction as the prediction value of the selected prediction counter if the confidence value of the selected prediction counter is greater than zero.

2. The method of claim 1, further comprising speculatively executing the branch instruction based on the memory-dependent branch prediction.

3. The method of claim 2, comprising overriding a branch prediction from a branch predictor of the processor, the branch predictor to provide branch prediction based on context information including one or more of a global branch history, a local branch history, branch path history, or a branch target history.

4. The method of claim 1, wherein the branch instruction is a memory-dependent branch instruction whose direction is dependent on a value loaded from a memory address by a prior load instruction.

5. The method of claim 1, comprising determining the load-path history from a load-path register, the load-path register formed by shifting in one or more least significant bits of PC values of prior load instructions.

6. The method of claim 1, wherein each of the plurality of prediction counters in the prediction counter pool are 2-bit counters, with a first bit comprising the confidence value and a second bit comprising the prediction value.

7. The method of claim 1, wherein each entry of the branch ID table further comprises a last hit timestamp and a last prediction timestamp, and wherein for the tag hit, updating the last hit timestamp with a time at which the tag hit occurred.

8. The method of claim 7, wherein upon obtaining the prediction value of the selected prediction counter for assigning the memory-dependent branch prediction of the branch instruction as the prediction value of the selected prediction counter, updating the last prediction timestamp with a time at which the prediction value of the selected prediction counter was obtained.

9. The method of claim 8, further comprising, for the tag hit, if the memory-dependent branch prediction of the branch instruction matches a subsequently evaluated correct direction of the branch instruction, incrementing the accuracy counter and setting the confidence value of the selected prediction counter to a confident value.

10. The method of claim 9, further comprising, for the tag hit, if the memory-dependent branch prediction of the branch instruction does not match a subsequently evaluated correct direction of the branch instruction, decrementing the accuracy counter, resetting the confidence value of the selected prediction counter to a not-confident value and updating the prediction value of the selected prediction counter to match the correct direction.

11. The method of claim 8, wherein for a tag miss wherein the tag field at the entry of the branch ID table corresponding to the index does not match the PC value of the branch instruction, predicting the branch instruction based on a branch prediction obtained from a branch predictor of the processor, the branch predictor to provide branch prediction based on context information including one or more of a global branch history, a local branch history, branch path history, or a branch target history.

12. The method of claim 11, further comprising, allocating the same or a different entry of the branch ID table for the branch instruction based on one or more heuristics for determining allocation in the branch ID table.

13. The method of claim 12, wherein the one or more heuristics are based on one or more of a footprint size of instructions being executed by the processor, a data value upon which the branch instruction being a memory-dependent branch instruction depends on, or current use of entries in the branch ID table.

14. The method of claim 13, wherein at least a golden list and a black list are associated with the branch ID table, wherein PCs of branch instructions whose memory-dependent branch predictions have high performance are inserted in the golden list and PCs of branch instructions whose memory-dependent branch predictions have low performance are inserted in the black list upon eviction from the branch ID table.

15. The method of claim 14, wherein the one or more heuristics are determined from one or more of the last hit timestamp, the last prediction timestamp, the accuracy counter value, and presence of the PC value in the black list or the golden list.

16. An apparatus comprising:
a processor configured to execute instructions, wherein the processor comprises at least a load-path history based branch predictor,
wherein the load-path history based branch predictor comprises:
a branch identification (ID) table comprising one or more entries, with each entry comprising at least a tag field, and an accuracy counter; and
a prediction counter pool comprising a plurality of prediction counters;
wherein for a branch instruction fetched by the processor for execution, the branch identification (ID) table is indexed based on a function of a program counter (PC) value of the branch instruction;
for a tag hit at an entry of the branch ID table indexed by the PC value wherein the tag field of the entry matches the PC value, if a value of the accuracy counter is greater than or equal to zero, a prediction counter is selected from the prediction counter pool,
wherein each of the plurality of prediction counters in the prediction counter pool comprises at least a respective confidence value and a prediction value,
wherein the prediction counter is selected based on a function of the PC value and a load-path history,
wherein the load-path history comprises information from prior load instructions executed by the processor; and
the load-path history based branch predictor is configured to assign a memory-dependent branch prediction of the branch instruction as the prediction value of the selected prediction counter if the confidence value of the selected prediction counter is greater than zero.

17. The apparatus of claim 16, wherein the processor is configured to speculatively execute the branch instruction based on the memory-dependent branch prediction.

18. The apparatus of claim 17, wherein the processor further comprises a branch predictor configured to provide branch prediction based on context information including one or more of a global branch history, a local branch history, branch path history, or a branch target history,
and wherein the processor is configured to override a branch prediction from the branch predictor, to speculatively execute the branch instruction based on the memory-dependent branch prediction.

19. The apparatus of claim 16, wherein the branch instruction is a memory-dependent branch instruction whose direction is dependent on a value loaded from a memory address by a prior load instruction.

20. The apparatus of claim 16, wherein the load-path history based branch predictor further comprises a load-path register comprising one or more least significant bits of PC values of prior load instructions, wherein the load-path register is configured to provide the load-path history.

21. The apparatus of claim 16, wherein each of the plurality of prediction counters in the prediction counter pool are 2-bit counters, with a first bit comprising the confidence value and a second bit comprising the prediction value.

22. The apparatus of claim 16, wherein each entry of the branch ID table further comprises a last hit timestamp and a last prediction timestamp, and wherein for the tag hit, the last hit timestamp is updated with a time at which the tag hit occurred.

23. The apparatus of claim 22, wherein the last prediction timestamp is updated with a time at which the prediction value of the selected prediction counter is obtained to be assigned as the memory-dependent branch prediction of the branch instruction.

24. The apparatus of claim 22, wherein, for the tag hit, if the memory-dependent branch prediction of the branch instruction matches a subsequently evaluated correct direction of the branch instruction, the accuracy counter is incremented and the confidence value of the selected prediction counter is set to a confident value.

25. The apparatus of claim 24, wherein, for the tag hit, if the memory-dependent branch prediction of the branch instruction does not match a subsequently evaluated correct direction of the branch instruction, the accuracy counter is decremented, the confidence value of the selected prediction counter is reset to a not-confident value, and the prediction value of the selected prediction counter is updated to match the correct direction.

26. The apparatus of claim 22, wherein the processor further comprises a branch predictor configured to provide branch prediction based on context information including one or more of a global branch history, a local branch history, branch path history, or a branch target history,
wherein for a tag miss wherein the tag field at the entry of the branch ID table corresponding to the index does not match the PC value of the branch instruction, the processor is configured to predict the branch instruction based on a branch prediction obtained from the branch predictor.

27. The apparatus of claim 26, wherein the same or a different entry of the branch ID table is allocated for the branch instruction based on one or more heuristics for determining allocation in the branch ID table.

28. The apparatus of claim 27, wherein the one or more heuristics are based on one or more of a footprint size of instructions being executed by the processor, a data value upon which the branch instruction being a memory-dependent branch instruction depends on, or current use of entries in the branch ID table.

29. The apparatus of claim 28, wherein the load-path history based branch predictor further comprises at least a golden list and a black list are associated with the branch ID table, wherein PCs of branch instructions whose memory-dependent branch predictions have high performance are inserted in the golden list and PCs of branch instructions whose memory-dependent branch predictions have low performance are inserted in the black list upon eviction from the branch ID table.

30. The apparatus of claim 29, wherein the one or more heuristics are determined from one or more of the last hit timestamp, the last prediction timestamp, the accuracy counter value, and presence of the PC value in the black list or the golden list.

31. The apparatus of claim 16, integrated into a device selected from the group consisting of a set top box, a server, a music player, a video player, an entertainment unit, a navigation device, a personal digital assistant (PDA), a fixed location data unit, a computer, a laptop, a tablet, a communications device, and a mobile phone.

32. An apparatus comprising:
means for executing instructions;
means for storing one or more entries for predicting memory-dependent branch instructions, each entry comprising at least means for storing a tag value and means for storing an accuracy value for the entry, wherein for a branch instruction fetched for execution by the means for executing instructions, the means for storing the one or more entries is indexed based on a function of a program counter (PC) value of the branch instruction;
a plurality of means for indicating prediction values and associated confidence values;
wherein, for a tag hit at an entry of the branch ID table indexed by the PC value, wherein the tag value matches the PC value, if the accuracy value is greater than or equal to zero, means for selecting one of the plurality of means for indicating, based on a function of the PC value and a load-path history, wherein the load-path history comprises information from prior load instructions executed by the means for executing instructions; and
means for assigning a memory-dependent branch prediction of the branch instruction as the prediction value of the selected means for indicating if the associated confidence value is greater than zero.

33. A non-transitory computer-readable storage medium comprising code, which, when executed by a computer causes the computer to perform branch prediction in a processor, the non-transitory computer-readable storage medium comprising:
for a branch instruction fetched by the processor for execution, code for indexing a branch identification (ID) table based on a function of a program counter (PC) value of the branch instruction, wherein the branch ID table comprises one or more entries, with each entry comprising at least a tag field, and an accuracy counter;
for a tag hit at an entry of the branch ID table indexed by the PC value, wherein the tag field of the entry matches the PC value, if a value of the accuracy counter is greater than or equal to zero, code for selecting a prediction counter from a prediction counter pool comprising a plurality of prediction counters,
wherein each of the plurality of prediction counters in the prediction counter pool comprises at least a respective confidence value and a prediction value,
wherein the code for selecting is based on a function of the PC value and a load-path history,
wherein the load-path history comprises information from prior load instructions executed by the processor; and
code for assigning a memory-dependent branch prediction of the branch instruction as the prediction value of the selected prediction counter if the confidence value of the selected prediction counter is greater than zero.

\* \* \* \* \*